(12) United States Patent
Almosallam et al.

(10) Patent No.: US 11,023,680 B2
(45) Date of Patent: Jun. 1, 2021

(54) METHOD AND SYSTEM FOR DETECTING SEMANTIC ERRORS IN A TEXT USING ARTIFICIAL NEURAL NETWORKS

(71) Applicant: The King Abdulaziz City for Science and Technology, Riyadh (SA)

(72) Inventors: Ibrahim A Almosallam, Riyadh (SA); Manal N Almutery, Riyadh (SA); Marwa M Khan, Riyadh (SA); Lulwah M Al-Yahyan, Riyadh (SA); Abdulrahman I Almuhareb, Riyadh (SA); Mohamed I Alkanhal, Riyadh (SA)

(73) Assignee: THE KING ABDULAZIZ CITY FOR SCIENCE AND TECHNOLOGY (KACST), Riyadh (SA)

( * ) Notice: Subject to any disclaimer, the term of this patent is extended or adjusted under 35 U.S.C. 154(b) by 431 days.

(21) Appl. No.: 15/046,380

(22) Filed: Feb. 17, 2016

(65) Prior Publication Data
US 2017/0235721 A1    Aug. 17, 2017

(51) Int. Cl.
*G06F 40/30*       (2020.01)
*G06F 40/232*      (2020.01)
*G06N 3/08*        (2006.01)

(52) U.S. Cl.
CPC .......... *G06F 40/30* (2020.01); *G06F 40/232* (2020.01); *G06N 3/084* (2013.01)

(58) Field of Classification Search
CPC .......... G06F 17/2785; G06F 17/2735; G06F 17/274; G06F 17/273; G06F 40/30; G06F 40/232; G06N 3/08; G06N 3/0472; G06N 3/084; G10L 15/16

USPC ................................................... 704/9
See application file for complete search history.

(56) References Cited

U.S. PATENT DOCUMENTS

| | | | | |
|---|---|---|---|---|
| 6,138,085 A | * | 10/2000 | Richardson | G06F 40/30 704/1 |
| 9,552,547 B2 | * | 1/2017 | Leeman-Munk | G06N 3/08 |
| 2004/0117189 A1 | * | 6/2004 | Bennett | G06F 17/27 704/270.1 |

(Continued)

OTHER PUBLICATIONS

Jackson Alice F., Bolger Donald J., "Using a high-dimensional graph of semantic space to model relationships among words", May 12, 2014, Frontiers in Psychology, vol. 5, pp. 1-14 (Year: 2014).*

*Primary Examiner* — Edwin S Leland, III
(74) *Attorney, Agent, or Firm* — Steven M. Shape; Dennemeyer & Associates, LLC

(57) ABSTRACT

The invention provides a method and system for automatically detecting semantic errors in a text. In order to detect the semantic errors in the text, the method generates a first set of features and a second set of features corresponding to each word in the text. A first set of features corresponds to statistical features of a word and a second set of features for a word corresponds to the features generated for a plurality of words surrounding the word in the text using matrix factorization techniques. The method, then, combines a first set of features and a second set of features to generate a third set of features corresponding to each word in the text. Thereafter, the method utilizes an Artificial Neural Network (ANN) model to detect semantic validity of each word based on a corresponding third set of features.

6 Claims, 7 Drawing Sheets

(56) References Cited

U.S. PATENT DOCUMENTS

| | | | |
|---|---|---|---|
| 2008/0183463 A1* | 7/2008 | Deane | G06F 40/30 |
| | | | 704/9 |
| 2012/0131015 A1* | 5/2012 | Al Badrashiny | G06F 17/273 |
| | | | 707/748 |
| 2016/0217367 A1* | 7/2016 | Moreno | G10L 15/16 |
| 2016/0350646 A1* | 12/2016 | Leeman-Munk | G06N 3/0445 |
| 2016/0350655 A1* | 12/2016 | Weiss | G06F 40/35 |
| 2017/0193086 A1* | 7/2017 | Zeng | G06N 5/04 |
| 2017/0235721 A1* | 8/2017 | Almosallam | G06F 40/232 |
| | | | 704/9 |

* cited by examiner

METHOD AND SYSTEM FOR DETECTING SEMANTIC ERRORS IN A TEXT USING ARTIFICIAL NEURAL NETWORKS

FIELD OF THE INVENTION

The invention generally relates to the field of automatically detecting semantic errors in a text using an Artificial Neural Network (ANN). More specifically, the invention relates to a method and system for automatically detecting semantic errors in a text using an ANN trained on linguistic properties of words in the text, wherein the linguistic properties of the words are obtained using statistical methods and co-occurrence information of the words relative to other words in the text.

BACKGROUND OF THE INVENTION

Most mistyped-words are caused by either keyboard slips or lack of knowledge in correct spellings. These errors usually result from inserting or deleting a letter, substituting a letter with another or by transposition (swapping) of two letters. Generally, two types of misspelling errors occur in a text namely non-word (morphological) spelling errors and real-word (semantic) spelling errors.

Non-word spelling errors are the words that are not included in a language dictionary since they do not follow morphological rules. For example, "water" mistyped or misspelt as "watre". Spelling checker tools identify the non-word spelling errors easily by searching in the language dictionary. Semantic spelling errors, on the other hand, are words that are morphologically and syntactically correct but result in an ambiguous sentence. Consider an example: ("hear"→"gear") in the sentence ("Can we hear the radio?"→"Can we gear the radio?"). In this example, there is only one different letter between the correct word and the real-word spelling error. However, since "gear" is a correct word, a typical spelling or grammar checker will not detect the error. Thus, the detection of semantic errors is a more challenging task since both correct and real-word errors are listed in the language dictionary. These words also have the same grammatical properties but are used in the wrong context.

Existing techniques are focused on detecting semantic errors such as, but not limited to, semantic distance, confusing sets and machine learning approaches. The semantic distance method is based on computing the degree of meaning between a word and its surrounding words but it faces issues with word sense disambiguation. The confusing sets method depends on targeting groups of words that are commonly mistaken for one another, such as (piece, peace), (quiet, quite) and (affect, effect). This approach however faces a problem when the size of the set increases.

The machine learning approaches, on the other hand, detect semantic errors using algorithms, such as, but not limited to, the Lsquare and Support Vector Machine (SVM). During the training phase, a large semantically correct text collection is used to train the classifier models. Theses classifiers are then used in the testing phase to test the existence of semantically spelled words in a given text. The Lsquare method is a rule-based two-class classification technique based on logic learning viewing both, the training data and the resulting classifiers as logic formulas. The SVM method finds a linear decision boundary which separates the training set into positive and negative examples using a maximum margin.

Further, a generic language models approach presents a model based on N-grams in order to detect invalid words in a sequence based on confusing sets of words that are commonly mistaken for each other.

All the above mentioned techniques for detecting semantic errors are trained on English corpora. The prior art also describes a technique that uses an Arabic corpus for the training. This approach checks the validity of each word in a text based on a Multi-Agent-System (MAS). It combines four statistical and linguistic methods to gain the advantages of each one. The first method used is a co-occurrence collection which calculates a word's frequency of appearance to verify its contextual validity depending on three measures namely the frequency of occurrence, coefficient of collocation and frequency of repetition. The second one is a Context-Vector method that represents each word in a sentence by a vector representing its context and then it calculates the norm of each vector to get the degree of correlation of each word. The third is a Vocabulary-Vector method which represents each word in a sentence using a vector according to its probability of occurrence with each word in the vocabulary using the measure of angular distance to evaluate the proximity between two words. Finally, the last method is Latent Semantic Analysis (LSA) which verifies the semantic validity of the word in a given sentence using the semantic vector extracted from a reduced matrix of co-occurrence. The decision is then taken by a voting process for choosing the most probable error from the submissions of each method.

Thus, the above mentioned techniques or model do not achieve a desired degree of accuracy while detecting semantic errors in a given piece of text.

Therefore, in light of the above, there is a need for an improved method and system for automatically detecting semantic errors in a text.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
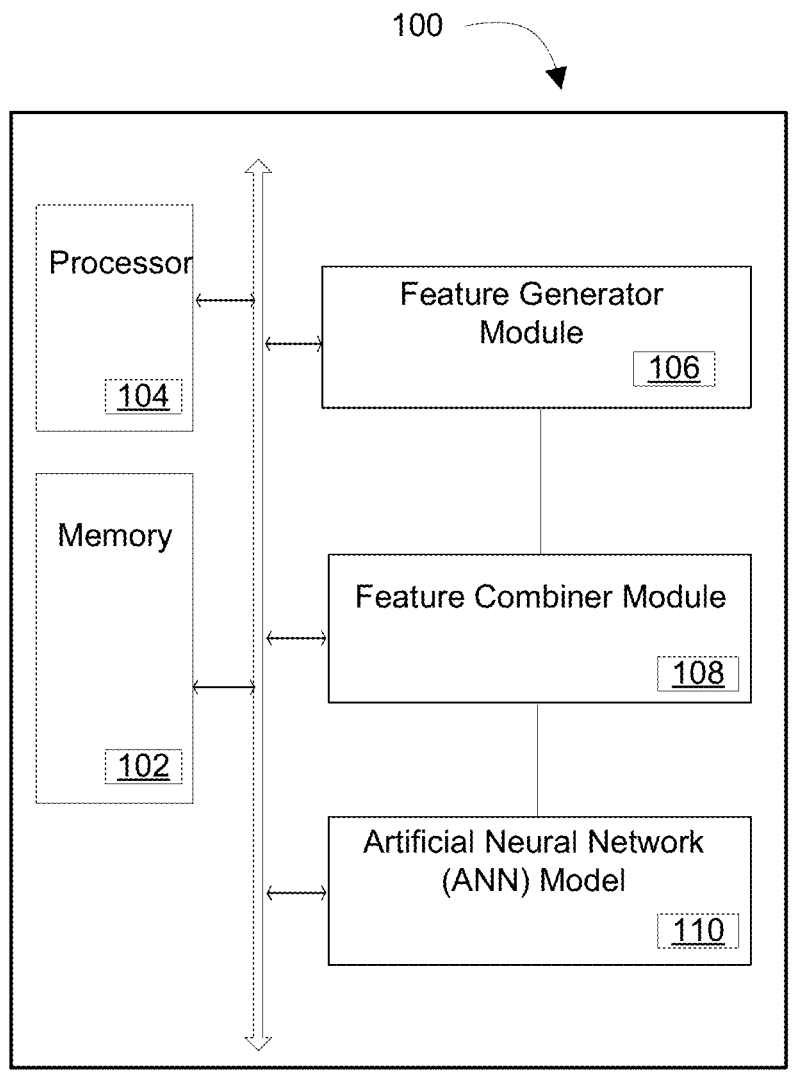
FIG. 1 illustrates a system for automatically detecting semantic errors in a text in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to automatically detecting semantic errors in a text using an Artificial Neural Network (ANN) model.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for automatically detecting semantic errors in a text, wherein the text includes a plurality of words. In order to detect the semantic errors in the text, the method generates a first set of features and a second set of features corresponding to each word in the text. The first set of features corresponds to statistical features of a word and the second set of features for the word corresponds to the features generated for a plurality of words surrounding the word in the text. The second set of features for the word is extracted using matrix factorization techniques. The method, then, combines the first set of features and the second set of features to generate a third set of features corresponding to each word in the text. Thereafter, the method utilizes an Artificial Neural Network (ANN) model to detect semantic validity of each word based on a corresponding third set of features.

FIG. 1 illustrates a system 100 for automatically detecting semantic errors in a text in accordance with an embodiment of the invention.

As illustrated in FIG. 1, system 100 includes a memory 102 and a processor 104 communicatively coupled to memory 102. Firstly, system 100 receives a text containing a plurality of words as input. The text can be in any language, such as, but not limited to, English, Arabic.

The received text is then fed into a feature generator module 106 communicatively coupled to both memory 102 and processor 104. Feature generator module 106 parses the input text and generates a first set of features and a second set of features corresponding to each word in the text. The first set of features for a word corresponds to statistical features of the word. The second set of features is generated for each word in the text by extracting features of a plurality of words surrounding the word using matrix factorization techniques. The matrix factorization techniques can include, but need not be limited to, a word-word co-occurrence matrix and a sentence-word co-occurrence matrix.

Once a first set of features and a second set of features are extracted for each word in the text, the extracted features are then fed into a feature combiner module 108 communicatively coupled to both memory 102 and processor 104.

Feature combiner module 108 combines a first set of features and a second set of features corresponding to each word in the input text to generate a third set of features.

The third set of features is then passed into an Artificial Neural Network (ANN) model 110 communicatively coupled to both memory 102 and processor 104. ANN model 110 utilizes the third set of features corresponding to each word in the input text to detect the semantic validity of the word.

Figure 2:
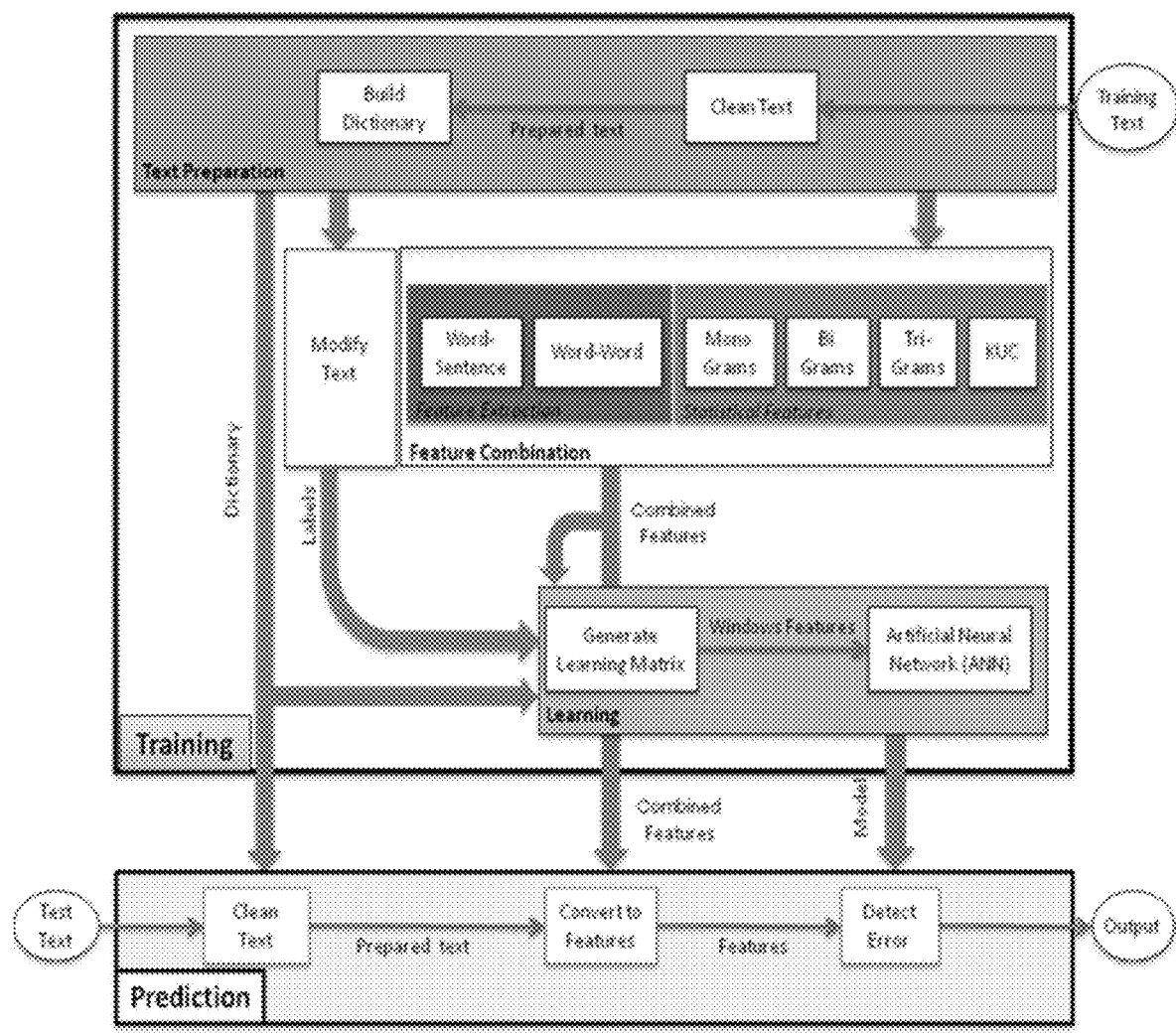
FIG. 2 illustrates a process flow for automatically detecting semantic errors in a text using the system in accordance with an embodiment of the invention.

The different processes executed by the components of system 100 are further described in detail in conjunction with FIG. 2.

FIG. 2 illustrates a process flow for automatically detecting semantic errors in a text using system 100 in accordance with an embodiment of the invention.

In accordance with FIG. 2, the statistical features of a word in the text are extracted in feature generator module 106 using N-gram techniques. N-gram techniques are widely used language modeling techniques in natural language processing and sequence modeling in bio-informatics. The statistical feature of a term is the probability of the term (word, syllable, letter, phoneme or a base pair) given its preceding N-terms. It is referred to as mono-grams, bi-grams and tri-grams when N is equal to 1, 2, and 3 respectively. For N larger than 3 it is commonly referred to as (number of preceding terms)-grams and when N is equal to 5, it is referred to as 5-grams. N-gram techniques are formulated as the following conditional probability $P(w_i|w_{i-(N-1)}, w_{i-(N-2)}, \ldots, w_{i-2}, w_{i-1})$, where the subscript i indicates the index of the word $w_i$ in the text. For each word w in location i relative to the text:

$P(w_i)$: Probability of the word $w_i$.

$P(w_i|w_{i-1})$: Probability of the word wi given the previous word.

$P(w_i|w_{i+1})$: Probability of the word wi given the next word.

$P(w_i|w_{i-1}, w_{i+1})$: Probability of the word wi given the previous and the next words.

$P(wi|w_{i-1}, w_{i-2})$: Probability of the word wi given the previous two words.

$P(w_i|w_{i+1}, w_{i+2})$: Probability of the word wi given the next two words.

With reference to the above, the first set is referred to as mono-grams, the second and third sets are the bi-grams whereas the last three sets are the tri-grams. These six features are collectively referred to as the N-grams features. These six features are computed for each word in the text and are stored in a feature vector $V_G$.

Thus, feature generator module 106 constructs an N-gram feature vector for each word in the text. Firstly, a dictionary is extracted from a corpus by selecting top frequent words and labeling all other low frequency words as unknown <UNK>. Two additional pseudo words are added <S> and <E> denoting the start and the end of a sentence. The number of words to include is determined such that they form a high percentage of a corpus body. Once the dictionary is built, a set of features is learned for each word. One set is extracted from the co-occurrences of the words with each other in the same sentence and the other from the co-appearances with the same words across different sentences.

N-grams are very strict in the sense that the probability distributions of the words and hence similarities of the words are highly sensitive to grammatical features or tense of the words. For example, words ending in "-ing" often have close probability distribution despite having different meaning or semantics. In order to compensate for this, additional features are extracted from "inter" relationships of the words as opposed to "intra" relationships of N-grams, under the assumption that words that co-occur in the same sentence more frequently are more related. Moreover, the co-appearance of the words across sentences is also used. This is essential since similar words may not always co-appear in the same sentence. For example, the words "Monday", "Tuesday", "Wednesday" . . . etc., are very similar but may not necessarily appear in the same sentence. These words however co-appear in proximity to similar words such as "day", "week", "date" and so on.

In order to extract the above mentioned features, feature generator module 106 constructs two matrices. A first matrix S is an n-by-m sentence-by-word matrix and a second matrix W is an m-by-m word-by-word matrix, where n is a number of sentences in a training corpus and m is a number of words in the dictionary. Each element at row i and column j in matrix S are populated with a number of times word j appeared in sentence i. The element at row i and column j in matrix W is a number of times words i and j appeared together in the same sentence. The matrix W is then prepared as follows:

The addition of one in both the numerator and the denominator is to resolve the zero probability problems. The counts are then divided by the sum to scale it from 0 to 1, and then finally the log of the ratio is computed to smooth the distribution. The matrix W is then standardized by subtracting the mean and dividing by the standard deviation, first along the columns and then along the rows. The S matrix is simply populated by the Term Frequency-Inverse Document Frequency (TF-IDF) as provided below.

$$TF - IDF = TF(w, s) \times IDF(w, S)$$

$$TF(w, s) = \log(1 + |\{w \in s\}|)$$

$$IDF(w, S) = \log\left(\frac{|S|}{|s \in S: w \in s|}\right)$$

where $|\{w \in s\}|$ denotes the number of times the word w appeared in sentence s, $|\{s \in S: w \in s\}|$ denotes the number of sentences from the corpus where the word w appeared and $|S|$ is the number of sentences in the corpus. The prepared matrices are then decomposed using Singular Value Decomposition (SVD) as $$S = U \Lambda V^T$$

where U is an n-by-n matrix, $\Lambda$ is an n-by-m diagonal matrix and V is an m-by-m matrix. The matrix S can be linearly approximated by selecting the first k vectors of each matrix as $$S = U_{(k)} \Lambda_{(k)} V^T_{(k)}$$

where $U_{(k)}$ is n-by-k, $\Lambda_{(k)}$ is k-by-k and $V_{(k)}$ is an m-by-k. The matrix $V_{(k)}$ is treated as a word-feature matrix and is referred to as $V_S$. The same procedure is applied to the word-by-word matrix W and the resulting feature matrix is referred to as $V_W$. The number of dimensions k is selected such that the new projected matrix captures a high percentage of the original matrix's variance. Specifically, the top k singular vectors are selected whose singular values constitute for example 95% of the total singular values in $\Lambda(k)$, or selecting the minimum value of k that satisfies the following equation.

$$\frac{\sum_{i=1}^{k} \Lambda_{ii}}{\sum_{i=1}^{m} \Lambda_{ii}} \geq \varepsilon$$

where $0 < \varepsilon \leq 1$ is the desired threshold or percentage of variance persevered. This threshold is determined in large by the space and computation limitation of system 100.

Once a first set of features and a second set of features are extracted for each word in the text using the above mentioned techniques, the extracted features are then fed into feature combiner module 108.

Feature combiner module 108 combines N-grams features ($V_G$), the word-by-word features ($V_W$) and the sentence-by-word features ($V_S$) for each word in the text to form a third set of features or a new vector for each word.

The third set of features or the new vector is then passed into ANN model 110. Thus, ANN model 110 is trained by passing samples generated from concatenating a window of features centered on a word in question to learn the mapping to a corresponding label. For example, consider a sentence like "In case of fire use the rear exist" generates a learning sample for the word "case" by concatenating the features of the words "<S>", "In", "case", "of" and "fire" next to each other in that order and the corresponding label is set to 1 when a window size is set to 5. In another example, if a window size is set to only 3, then only the features of "In", "case" and "of" are concatenated together. Further, a label is set to −1 for negative samples and 1 for positive samples as illustrated in FIG. 3.

Figure 3:
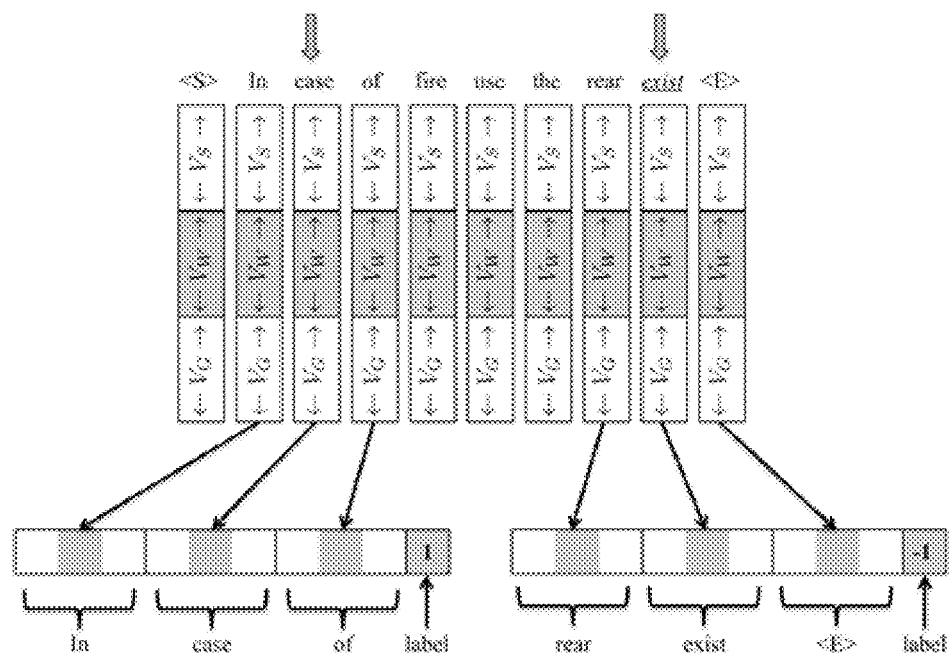
FIG. 3 illustrates feature concatenations for each word in a text when a label is set to −1 for negative samples and 1 for positive samples in accordance with an embodiment of the invention.

FIG. 3 illustrates feature concatenations for each word in the text when a label is set to −1 for negative samples and 1 for positive samples in accordance with an embodiment of the invention.

Moving on, ANN model 110 learns the mapping from a feature-set to a target label. ANN is a universal approximation function inspired from neuroscience and the activity of the brain. Thus, ANN model 110 models any arbitrary function F(x) to any desired degree of accuracy. More formally:

$$F(x) = \sum_{i=1}^{N} \alpha_i \phi(w_i^T x + b_i)$$

where x is the input, and N, $\alpha$, w and b are the learned parameters. $\varphi(x)$ can be any non-constant bounded monotonically increasing continuous function, a commonly used function is the sigmoid activation function as shown below.

$$\varphi = \frac{1}{1+e^{-x}}$$

Figure 4:
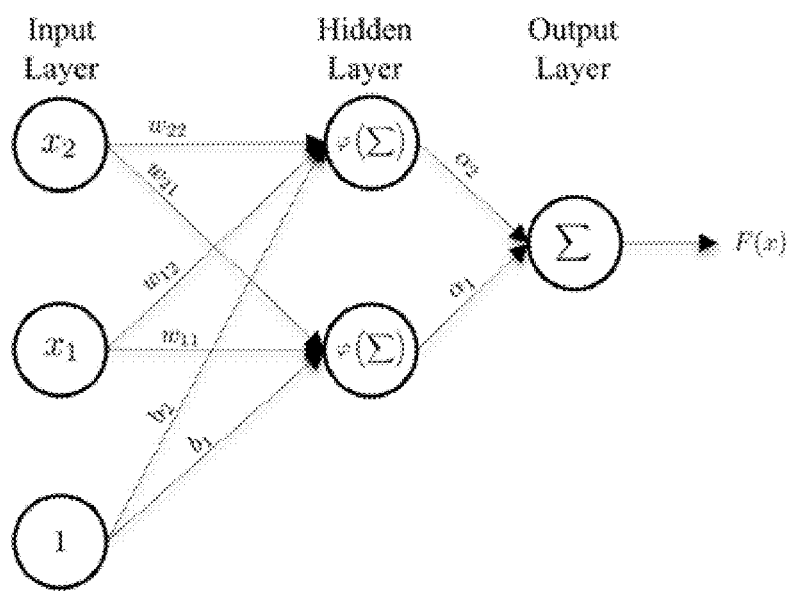
FIG. 4 illustrates a single layered neural network for detecting semantic errors in a text in accordance with an embodiment of the invention.
Figure 5:
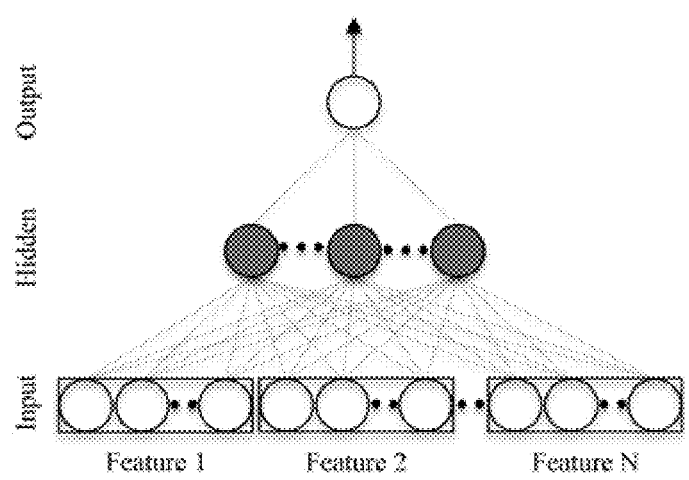
FIG. 5 illustrates a single layered neural network with extracted features as input in accordance with an embodiment of the invention.

In accordance with an embodiment of the invention, the sigmoid activation function is often represented pictorially as nodes (or neurons) connected by edges (or synapses) as illustrated in FIG. 4, where the symbol Σ is the sum of the edges going into a node multiplied by the output of source nodes. As illustrated in FIG. 4, a first layer is called the input layer, a second layer is the hidden layer and a last layer is the output layer. The nodes in the input layer correspond to the values of the input vector or x and the connections from the input layer to the hidden layer are the weights or the w term. Each node in the hidden layer corresponds to an activation function that transforms the input to new values via a non-linear function. The final layer is the output layer that combines the output of the hidden layer linearly via multiplying them with the α terms. This formulation guarantees that there exist a set of parameters that can approximate any continuous function to any desired degree of accuracy. A back propagation algorithm is used to find the values for the set of parameters as illustrated in FIG. 5.

Once ANN model 110 is trained, ANN model 110 utilizes a newly generated third set of features corresponding to each word in an input text to detect the semantic validity of the word.

Figure 6:
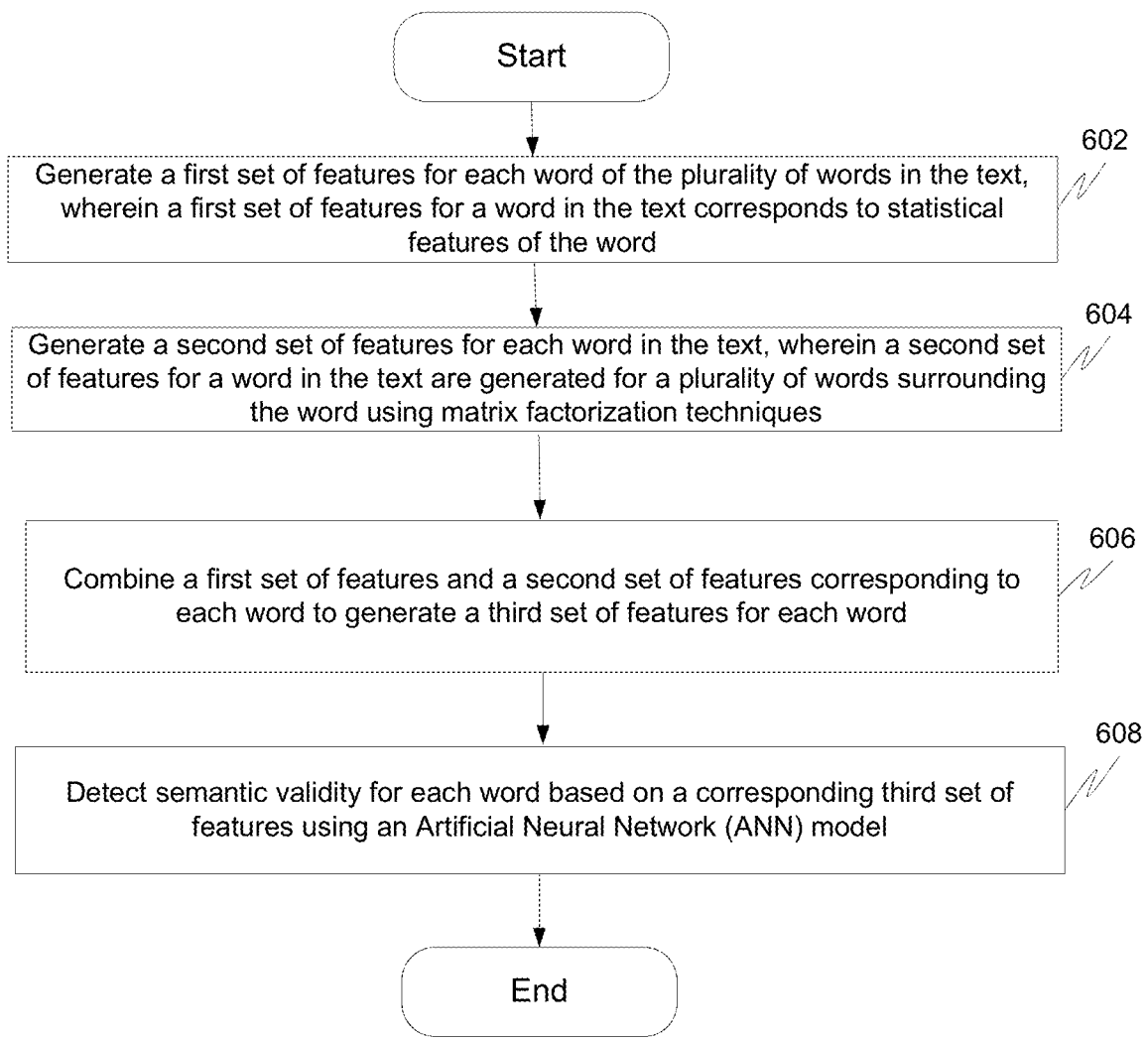
FIG. 6 illustrates a flowchart of a method for automatically detecting semantic errors in a text in accordance with an embodiment of the invention.

FIG. 6 illustrates a flowchart of a method for automatically detecting semantic errors in a text in accordance with an embodiment of the invention.

At step 602, a first set of features is generated for each word in the text using feature generator module 106. A first set of features for a word in the text corresponds to statistical features of the word.

Further, at step 604, a second set of features is generated for each word in the text using feature generator module 106. A second set of features for a word in the text is extracted from a plurality of words surrounding the word using matrix factorization techniques. The matrix factorization techniques include techniques such as, but not limited to, a word-word co-occurrence matrix and a sentence-word co-occurrence matrix.

Once the set of features are extracted, at step 606, a first set of features and a second set of features extracted for each word in the text are combined in feature combiner module 108 to generate a third set of features corresponding to each word in the text.

Thereafter, at step 608, the semantic validity of each word in the text is detected using ANN model 110 based on a third set of features corresponding to each word in the text. ANN model 110 is further trained on linguistic properties of the words in the text for automatically detecting semantic errors in the text.

Figure 7:
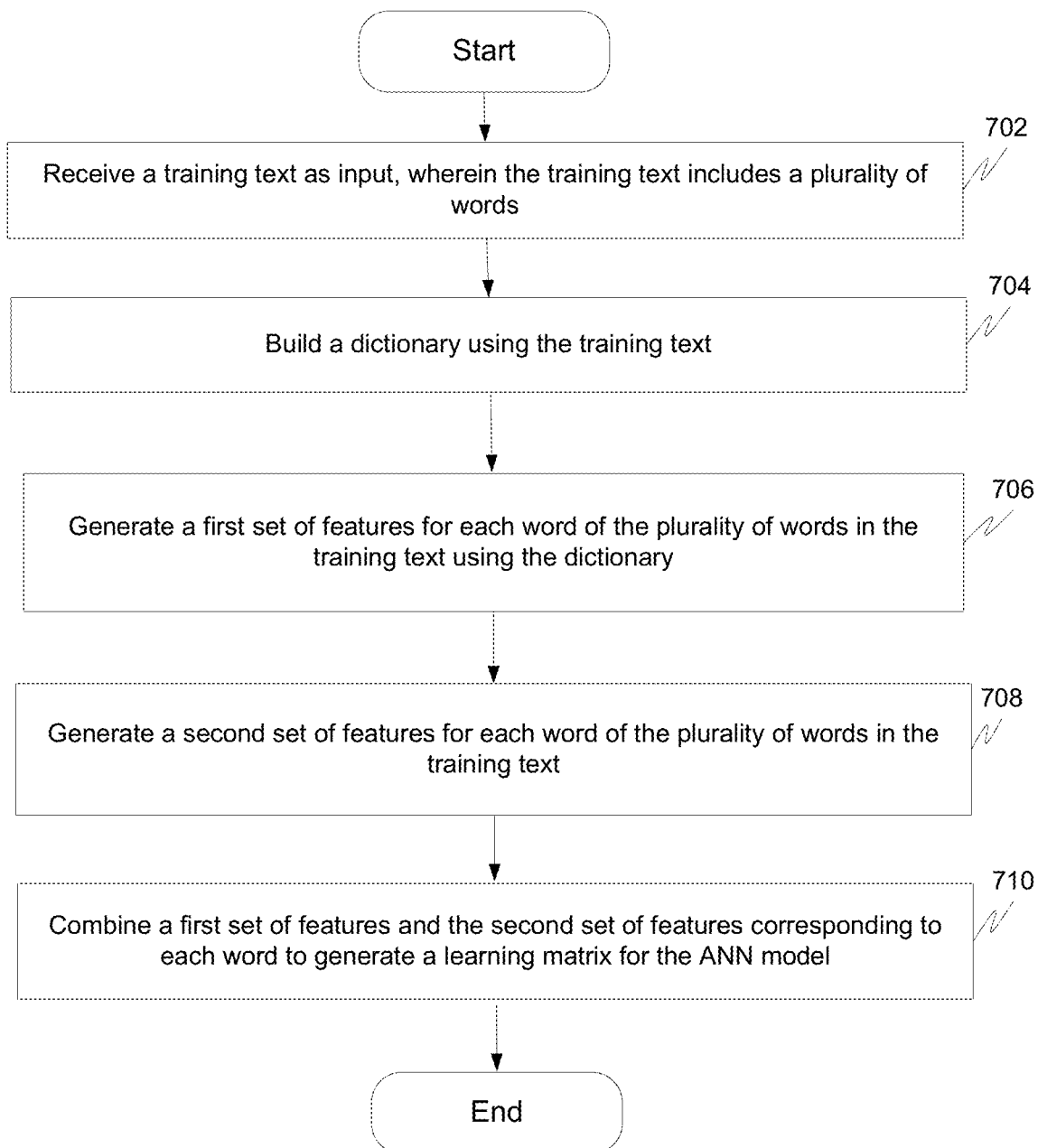
FIG. 7 illustrates a flowchart of a method for training an Artificial Neural Network (ANN) model for detecting semantic errors in a text in accordance with an embodiment of the invention.

FIG. 7 illustrates a flowchart of a method for training ANN model 110 in accordance with an embodiment of the invention.

At step 702, a training text is received as input to system 100. At step 704, processor 104 parses the training text and builds a dictionary using the training text. Moving on, at step 706, a first set of features is generated for each word in the text in feature generator module 106 using the dictionary. A first set of features for a word corresponds to statistical features of the word.

Further, at step 708, a second set of features is generated for each word in the text in feature generator module 106. A second set of features for a word in the text is extracted from a plurality of words surrounding the word using matrix factorization techniques.

Once the set of features are extracted, at step 710, a first set of features and a second set of features extracted for each word in the text are combined in feature combiner module 108 to generate a learning matrix for training ANN model 110.

The invention learns a function that evaluates the semantic validity of a word given its surrounding context. The function will take as input a window of word-features centered on a word in question and determines its probability of correctness.

Further, the invention is generic in nature and does not target certain words or confusion sets, but assumes that each word is incorrect and evaluates its semantic validity.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for automatically detecting semantic errors in a text, the text comprising a plurality of words, the method comprising:
   training an Artificial Neural Network (ANN) model on linguistic properties of the plurality of words, wherein training the ANN model comprises:
      receiving a training text as input, wherein the training text includes a plurality of words;
      parsing the training text to build a dictionary using the training text;
      generating a first set of features for each word of the plurality of words in the training text using the dictionary, wherein the first set of features for each word corresponds to statistical features of each word;
      generating a second set of features for each word, wherein the second set of features for each word is extracted from a plurality of words surrounding each word using a matrix factorization technique;

generating a learning matrix for training the ANN model on linguistic properties of the plurality of words in the text, wherein the linguistic properties of the plurality of words are obtained by combining the first set of features extracted for each word with the second set of features extracted for each word; and learning a function that evaluates a semantic validity of each word based on a context surrounding each word, wherein the function receives as input a window of word-features centered on a first word in question and determines a probability of correctness for each word;

generating a first set of features through a processor for a first word of the plurality of words in the text, wherein the first set of features corresponds to a plurality of statistical features of the first word;

generating a second set of features through a processor for the first word, wherein the second set of features are extracted from a plurality of words surrounding the first word using a matrix factorization technique;

combining the first set of features and the second set of features corresponding to the first word through a processor to generate a third set of features for the first word corresponding to the first word;

detecting a semantic validity for the first word in the text based on the third set of features corresponding to the first word using the ANN model; and automatically detecting a semantic error in the text based on trained linguistic properties of the first word in the ANN model.

2. The method according to claim 1, wherein a first statistical feature of a plurality of statistical features of the first word is a probability of occurrence of the first word in context of the plurality of words surrounding the first word.

3. The method according to claim 2, wherein the first statistical feature is extracted for the first word using an n-gram technique.

4. The method according to claim 3, wherein the n-gram technique comprises at least one of a monogram, a bi-gram and a tri-gram.

5. The method according to claim 1, wherein the matrix factorization technique comprises at least one of a word-word co-occurrence matrix or a sentence-word co-occurrence matrix.

6. A system for automatically detecting semantic errors in a text, the text comprising a plurality of words, the system comprising:
  a memory;
  a processor communicatively coupled to the memory, wherein the processor is configured to:
    train an Artificial Neural Network (ANN) model on linguistic properties of the plurality of words, wherein training the ANN model comprises:
      receiving a training text as input, wherein the training text includes a plurality of words;
      parsing the training text to build a dictionary using the training text;
      generating a first set of features for each word of the plurality of words in the training text using the dictionary, wherein the first set of features for each word corresponds to statistical features of each word;
      generating a second set of features for each word, wherein the second set of features for each word is extracted from a plurality of words surrounding each word using a matrix factorization technique;
      generating a learning matrix for training the ANN model on linguistic properties of the plurality of words in the text, wherein the linguistic properties of the plurality of words are obtained by combining the first set of features extracted for each word with the second set of features extracted for each word; and
      learning a function that evaluates a semantic validity of each word based on a context surrounding each word, wherein the function receives as input a window of word-features centered on a first word in question and determines a probability of correctness for each word;
    generate a first set of features for a first word of the plurality of words in the text, through the processor, wherein a first set of features corresponds to a plurality of statistical features of the first word;
    generate a second set of features for the first word, through the processor, wherein the second set of features are extracted from a plurality of words surrounding the first word using a matrix factorization technique;
    combine the first set of features and the second set of features corresponding to the first word, through the processor, to generate a third set of features for the first word corresponding to the first word;
    detect a semantic validity through the processor for the first word in the text based on the third set of features corresponding to the first word using the ANN model; and
    automatically detect a semantic error in the text through the processor based on trained linguistic properties of the first word in the ANN model.

* * * * *